United States Patent
Giles-Brown et al.

(10) Patent No.: US 9,440,575 B2
(45) Date of Patent: Sep. 13, 2016

(54) DUMP TRUCK BODY WITH SLANTED TOP RAIL

(71) Applicant: Caterpillar Inc., Peoria, IL (US)

(72) Inventors: Iain James Giles-Brown, Tyne & Wear (GB); Christopher Paul Took, Seaham (GB)

(73) Assignee: Caterpillar Inc., Peoria, IL (US)

(*) Notice: Subject to any disclaimer, the term of this patent is extended or adjusted under 35 U.S.C. 154(b) by 401 days.

(21) Appl. No.: 13/647,544

(22) Filed: Oct. 9, 2012

(65) Prior Publication Data

US 2014/0099181 A1   Apr. 10, 2014

(51) Int. Cl.
*B60P 1/16* (2006.01)
*B60P 1/28* (2006.01)

(52) U.S. Cl.
CPC . *B60P 1/16* (2013.01); *B60P 1/286* (2013.01)

(58) Field of Classification Search
CPC .............. B60P 1/16; B60P 1/28; B60P 1/286
USPC .............. 298/22 R, 22 P, 7, 17 R; 296/183.2
See application file for complete search history.

(56) References Cited

U.S. PATENT DOCUMENTS

| | | | |
|---|---|---|---|
| 1,414,954 A * | 5/1922 | Jensen-Bearlundd | .... B60P 1/32 298/17 R |
| 2,490,532 A | 12/1949 | Maxon, Jr. | |
| 3,208,790 A | 9/1965 | Domes | |
| 3,228,351 A | 1/1966 | Flowers | |
| 3,844,616 A | 10/1974 | Acker | |
| 4,826,233 A | 5/1989 | Hagenbuch | |
| 5,235,762 A | 8/1993 | Brady | |
| 6,623,234 B1 | 9/2003 | Herring et al. | |
| 7,407,217 B2 | 8/2008 | Compaan | |
| 7,789,467 B2 * | 9/2010 | Rogers et al. | .................. 298/18 |

FOREIGN PATENT DOCUMENTS

JP          62210145          9/1987

* cited by examiner

*Primary Examiner* — Stephen Gordon

(57) ABSTRACT

A dump body which dissuades material from sitting on a top surface of a sidewall of the dump body and thereby reduces spillage while hauling material is disclosed. The dump body may additionally allow an operator of a loader to clearly distinguish the edge of the dump body to facilitate loading and reduce structural damage. The dump body may further create a lower center of gravity while hauling the same payload, which may reduce the risk of rolling the dump body. The dump body may include a pair of sidewalls attached on opposing sides of a bottom wall and extending upwardly, with each having a top surface inclined toward an interior of the dump body. The incline may start at an inside edge of the sidewall and extend upwardly to an outside edge of the sidewall residing at a very outer extent of the sidewall.

13 Claims, 3 Drawing Sheets

DUMP TRUCK BODY WITH SLANTED TOP RAIL

FIELD OF THE DISCLOSURE

The present disclosure generally relates to dump trucks, and more particularly relates to dump bodies for dump trucks.

BACKGROUND OF THE DISCLOSURE

A dump body is a piece of machinery used to receive material from one location, hold the material during transport to another location, and then deposit the material in the new location. Typically, dump bodies are used by earth moving machines such as single chassis dump trucks, or articulated dump trucks, for example, to move a payload that may include dirt, rocks, concrete, or the like.

A dump body mounted on a dump truck may carry a payload from one location to another location. Then, another machine may remove the payload from the dump body. Alternately, the dump truck may have an actuator supported by the chassis and disposed under the dump body. When the actuator is activated the dump body becomes inclined, which allows gravity to remove the payload from the dump body without the need of another machine.

While effective, an issue arises when the dump body is completely filled. Some material may sit on the top surface of the sidewalls of the dump body and fall off while the dump truck is in motion. This can cause the road to become blocked, materials to be lost, or injury to workers near the truck. Additionally, the material sitting on the top surface may cover the edge of the sidewall, causing an operator of a loader to spend extra time locating the edge of the side wall or risk damage to the loader or the dump body while loading and unloading the dump body. Therefore, a need exists for a dump body which better retains material in the dump body and allows an operator of a loader to quickly recognize the edge of the dump body to avoid wasting time and damaging the equipment.

Another issue arises specifically for articulated dump trucks. An articulated dump truck may be split into two separate chassis, one chassis including the operator cabin and engine while the other includes the dump body, and connected by a column that allows rotation of each chassis with respect to the other. Articulated dump trucks offer greater flexibility when traveling over rough or steep terrain than dump truck that consist of only one chassis. However, the chassis including the dump body is prone to rolling while fully loaded, in part because of a relatively high center of gravity of the body and payload. While one solution to this problem would be to increase the width to height ratio of the dump body, the size of the dump bodies are limited by roadways which the articulated dump trucks are transported on and by the paths the trucks travel on in the work area. Thus, a need exists for a dump body which can carry the same payload while reducing the center of gravity of the entire dump body and chassis while not increasing the width to height ratio of the dump body.

SUMMARY OF THE DISCLOSURE

In accordance with one aspect of the disclosure, a dump body is disclosed. The dump body may comprise: a bottom wall oriented horizontally; a proximal end wall attached to a proximal end of the bottom wall and extending upward; and a pair of sidewalls attached to opposing sides of the bottom wall and extending upward, and having a top surface inclined toward an interior of the dump body, the incline starting at an inside edge of the sidewall and extending to an outside edge of the sidewall.

In a refinement, the top surface of the sidewall is inclined 45 degrees.

In another refinement, the proximal end wall has a top surface inclined towards the interior of the dump body, the incline starting at an inside edge of the end wall and extending to an outside edge of the end wall.

In another refinement, a distal end wall is attached at a distal end of the bottom wall and extends upward.

In a further refinement, a top surface of the distal end wall is inclined towards the interior of the dump body, the incline starting at an inside edge of the end wall and extending to an outside edge of the end wall.

In yet a further refinement, the distal end wall comprises a tailgate.

In a further refinement, the tailgate is attached to the dump body by a scissor hinge.

In accordance with another aspect of the disclosure, an earth moving vehicle is disclosed. The earth moving vehicle may comprise: a chassis; an operator cabin supported by the chassis; and a dump body supported by the chassis which may further comprise: a proximal end wall attached to a proximal end of the bottom wall and extending upward; and a pair of sidewalls attached to opposing sides of the bottom wall and extending upward, and having a top surface inclined toward an interior of the dump body, the incline starting at an inside edge of the sidewall and extending to an outside edge of the sidewall.

In a refinement, the top surface of the sidewall is inclined 45 degrees.

In another refinement, the proximal end wall has a top surface inclined toward the interior of the dump body.

In yet another refinement, the dump body has a distal end wall attached at a distal end of the bottom wall.

In a further refinement, the distal end wall comprises a tailgate.

In a further refinement, the tailgate is attached to the dump body by a scissor hinge.

In yet a further refinement, a top surface of the distal end wall is inclined toward the proximal end wall.

In another refinement, a proximal end of the dump body is raised and lowered by an actuator system supported by the chassis.

In yet another refinement, the earth moving vehicle is an articulated dump truck.

In a further refinement, a load of material is disposed in the interior of the dump body, the load filling the interior beyond the inside edge of the sidewall but not exceeding the outside edge of sidewall.

In accordance with yet another embodiment of the disclosure, a method for loading a dump body is disclosed. The method for loading a dump body may comprise the step of providing a dump body which may comprise: a bottom wall oriented horizontally; a proximal end wall attached at a proximal end of the bottom wall and extending upward; and a pair of sidewalls attached on opposing sides of the bottom wall and extending upward, and having a top surface inclined towards an interior of the dump body, the incline starting at an inside edge of the sidewall and extending to an outside edge of the sidewall. The method for loading a dump body may further comprise the steps: filling the dump body with a load of material beyond the inside edge of the sidewall, but not exceeding the outside edge of the sidewall;

and having the outside edge of the sidewall clearly visible during loading of the dump body.

In a refinement, the top surface of the sidewall is inclined 45 degrees.

In a further refinement, the dump body is mounted on a chassis of an articulated dump truck.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
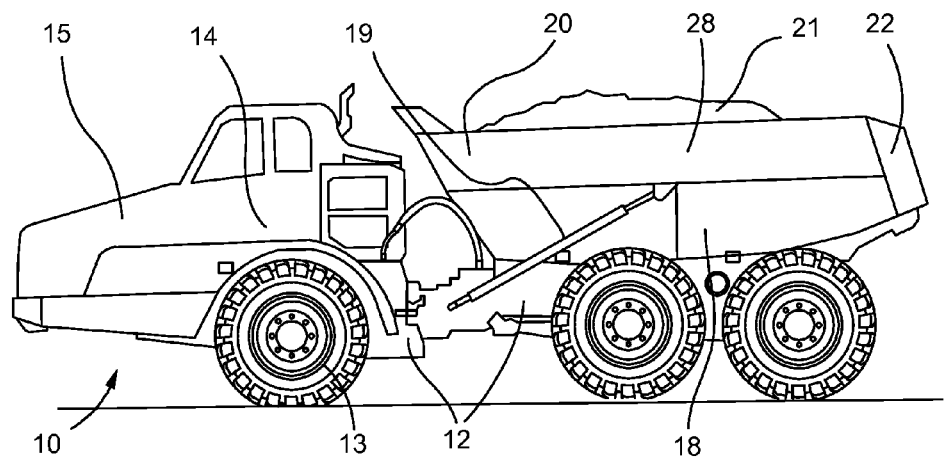
FIG. 1 is a side view of an earth moving vehicle constructed in accordance with an embodiment of the present disclosure.

Referring now to the drawings, and with specific reference to FIG. 1, a wheeled dump truck 10 is shown to include a chassis 12. As shown therein, the dump truck is an articulated dump truck, but it is to be understood that the body of this disclosure can be used with equal efficacy in connection with more conventional dump trucks having a single chassis 12 or another type of earth moving machine. The chassis 12 may be supported by wheels 13 (or tracks on other locomotion devices), and itself support an operator cabin 14 and an engine 15. A dump body 18 may be positioned above an actuator system 19, with both being supported by the chassis 12 as well. The actuator system 19 may include one or more hydraulic cylinders (not shown) to raise and lower the dump body 18 at the proximal end 20, and thereby incline the dump body 18 in order to expel a payload 21 at a distal end 22.

The dump body 18 may include a bottom wall 23 which may have a proximal end 24. A proximal end wall 26 may be connected to the bottom wall 23 at the proximal end 24 and extend upwardly. First and second sidewalls 28 may connect to the sides of the bottom wall 23 and also to the sides of the proximal end wall 26 and extend upwardly as well.

Figure 2:
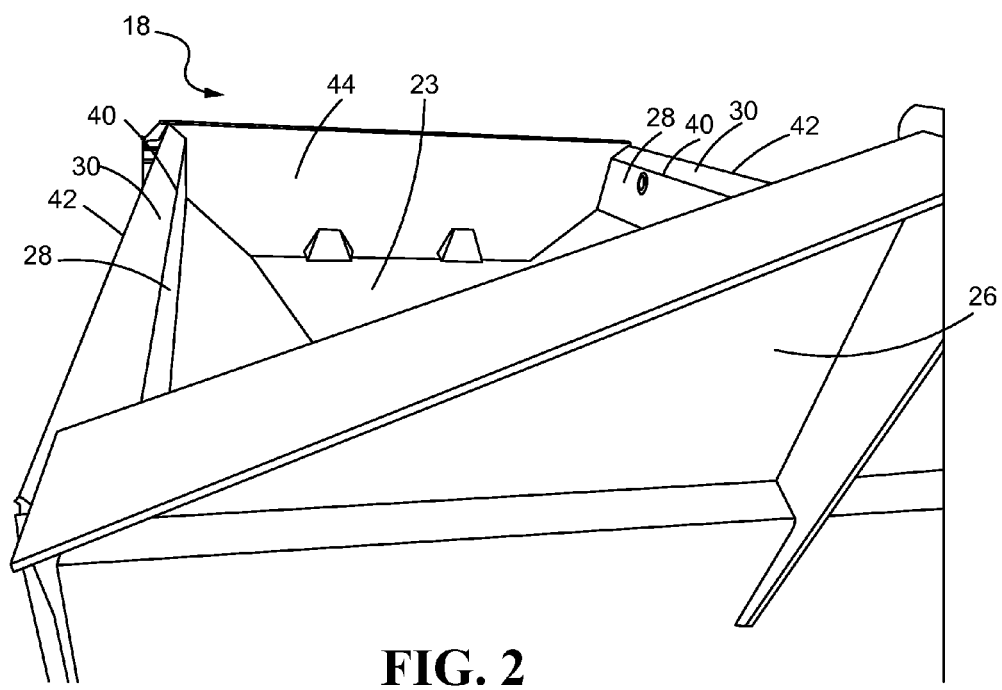
FIG. 2 is a perspective view of a dump body constructed in accordance with an embodiment of the present disclosure.

As shown in FIG. 2, the sidewalls 28 may each include a top surface 30 which is inclined toward an interior 44 of the dump body 18. The incline may extend from an inside edge 40 upwardly to an outside edge 42 residing at the very outer extent of the sidewall 28. The incline of the top surface 30 may allow gravity to move payload material towards the interior 44 of the dump body 18 and not sit on the top surface 30. This may prevent the material from falling off the top surface 30 of the sidewall 28, which may block the road, result in the material being lost, or injure a worker.

Additionally, the inclined top surface 30 may allow an operator of a loader (not shown) to quickly distinguish the edge of the sidewall 28 and thereby not hit the sidewall 28 with the loader, or spend excess time discerning the edges of the sidewall 28 before dumping. More specifically, the dump truck 10 may be designed to carry a payload of a hundred tons or more. To efficiently load the dump body 18, a large loader (not shown) may itself have a large bucket capacity of many tons to enable loading of the dump body 18 in a few passes. Accordingly, when the operator of the loader is trying to release a bucket load into the dump body 18, he or she wants to make sure the bucket is directly and precisely over the dump body 18. This will not only ensure the entire load is dropped into the dump body 18, but also avoid any contact between and/or damage to the bucket and the sides of the dump body 18. Any load or debris resting on the top of the sidewalls 28 will necessarily make it more difficult for the operator to discern the edge of the dump body 18 and thus either cause him to take more time in precisely maneuvering his bucket or result in damage. Accordingly, with the provision of an inclined top surface 30, termination of same at the very outer extent of the outside edge 42, and downwardly sloping of the top surface toward the inside edge 40, the operator is provided with an easily discernible line of demarcation outlining where the dump body is and where the bucket must be prior to dumping.

In an exemplary embodiment the top surface 30 is inclined at a 45 degree angle, but other angles of more or less than 45 degrees are certainly possible. In an additional embodiment, the proximal end wall 26 may also have a top surface 30 which may also be inclined towards the interior 44 of the dump body 18. This top surface 30 may also incline upwardly from an inside edge 40 to an outside edge 42, and may be provided at 45 degrees or some other suitable angle to provide the same advantages indicated above.

Figure 3:
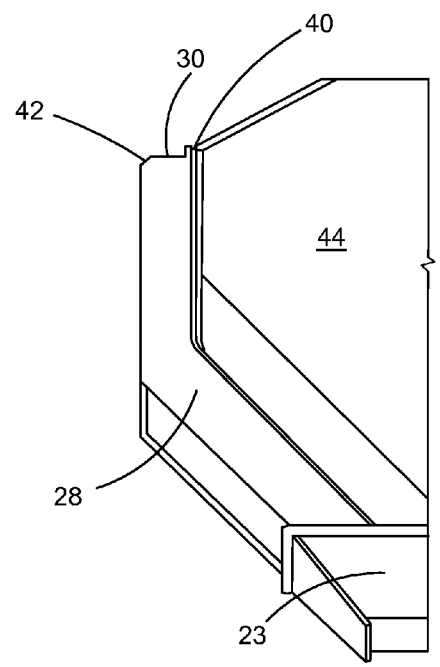
FIG. 3 is an end view of a prior art sidewall.
Figure 4:
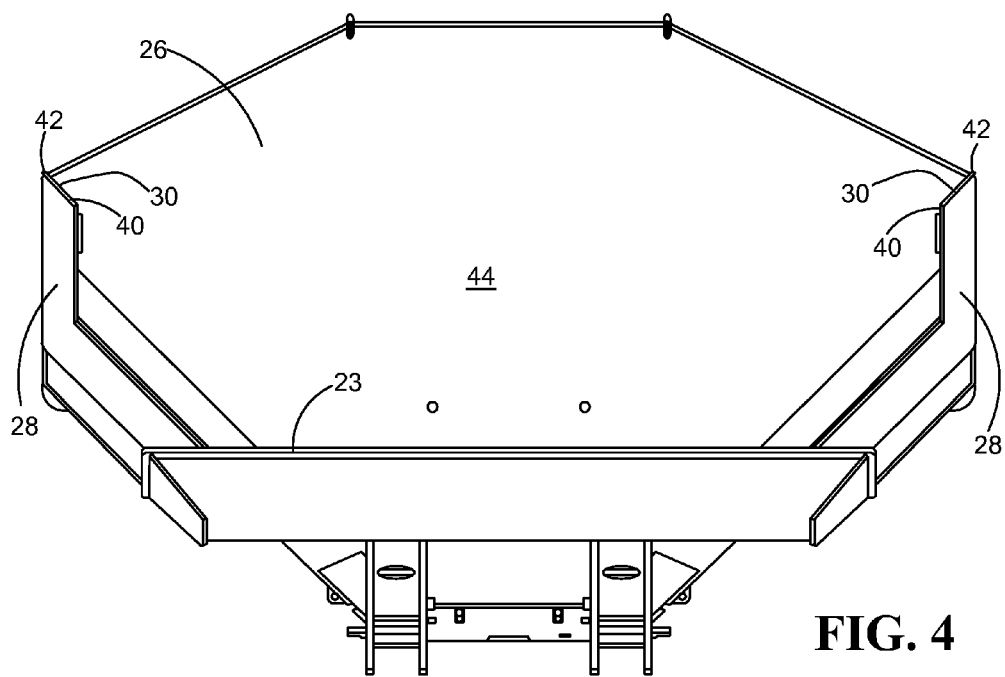
FIG. 4 is an end view of a sidewall constructed in accordance with the present disclosure.

FIG. 3 is an end view of a prior art sidewall 28. The sidewall is shown to have a horizontal top surface 30. By contrast, FIG. 4 is an end view of a sidewall 28 built in accordance with the present disclosure, the top surface 30 being inclined 45 degrees, with the incline extending from an inside edge 40 all the way up to an outside edge 42 residing at the very outer extent of the sidewall 28.

Figure 5:
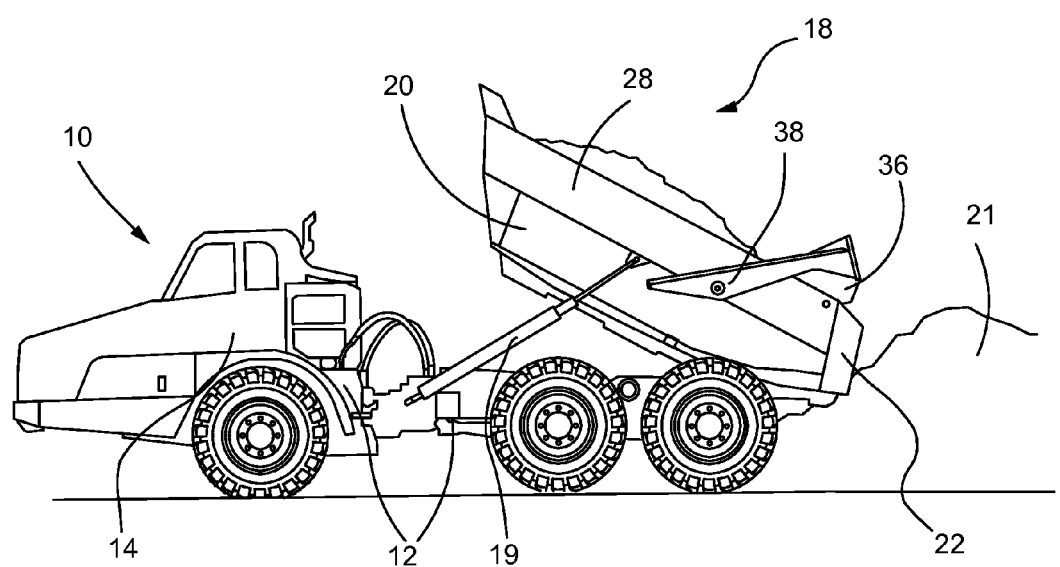
FIG. 5 is a side view of a dump truck constructed in accordance with an embodiment of the present disclosure.

In a separate embodiment, shown in FIG. 5, the dump body 18 as described above may additionally include a distal end wall 32 attached to the bottom wall 22 at a distal end 34 and extend upward. The distal end wall 32 may further include a tailgate 36 which may be opened and closed by way of a scissor hinge 38 or the like attached to the dump body 18. The tailgate 36 may facilitate the removal of the payload by utilizing the actuator system 19 to raise the proximal end 20 of the dump body 18. Gravity or another machine may be used to remove the payload through the tailgate 36, when the tailgate 36 is open.

In addition to causing the payload to funnel back toward to dump body 18 and providing a clearly defined dump body demarcation line, the inclined top surface 30 also provides for extra storage space for the payload carried by the dump body 18. The extra storage space allows the dump body 18 to carry a larger payload while maintaining about the same center of gravity as prior art designs without the included top surface 30. This may be accomplished by filling the dump body 18 to the same height as prior dump bodies, but then relying on the inclined top surface 30 to retain more of the payload 21 than previously possible. In so doing, an increased payload at the same height is provided, while maintaining about the same center of gravity for the dump body 18 as prior dump bodies.

Alternately, depending on the relative width of the dump body 18, the height of the sidewalls 28, and the incline of top surface 30 the angle of the center of gravity of the dump body 18 in relation to prior dump bodies may actually be lower, while still carrying the same payload. The extra storage space provided by the top surface 30 in such an embodiment may actually lower the height of the payload in the dump body 18, thereby lowering the center of gravity of the entire dump body 18. In an exemplary embodiment of the inclined top surface 30, the teaching of the present disclosure allowed the center of gravity of the dump body 18 to be lowered significantly, for example, by about fifty millimeters, other reductions may also be possible. With the articulated dump truck 10, this may be particularly advantageous, but for the teachings of the present disclosure dump bodies may be prone to rolling while fully loaded due to a driver error, a misjudgment of speed, an overloaded state of the dump body, or a condition of the ground which the articulated dump truck is traversing. Lowering the center of gravity of the dump body 18 as taught herein will therefore improve the overall stability of the truck 10.

INDUSTRIAL APPLICABILITY

From the foregoing, it can be seen that the technology disclosed herein has industrial applicability in a variety of settings such as, but not limited to single chassis dump trucks, articulated dump trucks, and other earth moving machines. The disclosure does so in part, by reducing the overflow of materials from the dump body of an earth moving vehicle, as well as allowing an operator of a loader to quickly determine the edge of the sidewall. In addition the center of gravity may be lower than in prior art dump bodies for the same payload, which may reduce the risk of toppling the payload, or rolling the entire earth mover or dump body.

What is claimed is:

1. A dump body, comprising:
   a bottom wall oriented horizontally;
   a proximal end wall attached at a proximal end of the bottom wall and extending vertically; and
   a pair of sidewalls attached on opposing sides of the bottom wall and extending vertically, each sidewall having a planar outer surface, a planar inner surface, and a planar top surface extending between the planar outer surface and the planar inner surface, the planar top surface being inclined towards an interior of the dump body, the incline starting at an innermost lateral edge of each sidewall and upwardly extending to an outermost lateral edge of each sidewall, each planar top surface being at a different angular orientation than each planar outer surface and each planar inner surface.

2. The dump body of claim 1, wherein the top surface of each sidewall is inclined 45 degrees.

3. The dump body of claim 1, wherein the proximal end wall has a top surface inclined towards the interior of the dump body, the top surface incline starting at an inside edge of the end wall and extending to an outside edge of the end wall.

4. The dump body of claim I, wherein a distal end wall is attached at a distal end of the bottom wall and extends upward.

5. The dump body of claim 4, wherein a top surface of the distal end wall is inclined towards the interior of the dump body, the incline starting at an inside edge of the end wall and extending to an outside edge of the end wall.

6. An earth moving vehicle, comprising:
   a chassis;
   an operator cabin supported by the chassis; and
   a dump body supported by the chassis, comprising;
   a bottom wall oriented horizontally;
      a proximal end wail attached at a proximal end of the bottom wall and extending vertically; and
   a pair of sidewalls attached on opposing sides of the bottom wall and extending vertically, each sidewall having a Omar outer surface, a planar inner surface, and a planar top surface extending between the planar outer surface and the planar inner surface, the planar top surface being inclined towards an interior of the dump body, the incline starting at an innermost lateral edge of each sidewall and upwardly extending to an outermost lateral edge of each sidewall, each planar top surface being at a different angular orientation than each planar outer surface and each planar inner surface.

7. The earth moving vehicle of claim 6, wherein the top surface of each sidewall is inclined 45 degrees.

8. The earth moving vehicle of claim 6, wherein the proximal end wall has a top surface inclined toward the interior of the dump body.

9. The earth moving vehicle of claim 6, wherein the dump body has a distal end wall attached at a distal end of the bottom wall.

10. The earth moving vehicle of claim 9, wherein a top surface of the distal end wall is inclined toward the proximal end wall.

11. The earth moving vehicle of claim 6, wherein a proximal end of the dump body is raised and lowered by an actuator system supported by the chassis.

12. The earth moving vehicle of claim 6, wherein the earth moving vehicle is an articulated dump truck.

13. The articulated dump truck of claim 12, wherein a load of material is disposed in the interior of the dump body, the load filling the interior beyond the innermost edge of each sidewall with respect to a dump body width but not exceeding the outermost edge of each sidewall with respect to a dump body width.

* * * * *

UNITED STATES PATENT AND TRADEMARK OFFICE
CERTIFICATE OF CORRECTION

PATENT NO. : 9,440,575 B2
APPLICATION NO. : 13/647544
DATED : September 13, 2016
INVENTOR(S) : Giles-Brown et al.

It is certified that error appears in the above-identified patent and that said Letters Patent is hereby corrected as shown below:

In the Claims

Column 6, Line 6, In Claim 4, delete "The dump body of claim I," and insert -- The dump body of claim 1, --.

Column 6, Line 22, In Claim 6, delete "Omar outer" and insert -- planar outer --.

Signed and Sealed this
Seventh Day of March, 2017

Michelle K. Lee
*Director of the United States Patent and Trademark Office*